(12) United States Patent
Winslow

(10) Patent No.: US 6,356,819 B1
(45) Date of Patent: Mar. 12, 2002

(54) SAFETY SYSTEM FOR GUIDANCE CONTROL SYSTEM

(75) Inventor: Phillip D. Winslow, Hayward, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/063,636

(22) Filed: Apr. 20, 1998

(51) Int. Cl.$^7$ ................................................ B62D 6/00
(52) U.S. Cl. ............................ 701/23; 701/43; 180/168
(58) Field of Search ............................ 701/41, 43, 29, 701/48, 23, 36; 180/168, 409, 410, 413, 415

(56) References Cited

U.S. PATENT DOCUMENTS

| | | | | |
|---|---|---|---|---|
| 5,245,422 A | * | 9/1993 | Borcherts et al. | 358/103 |
| 5,424,502 A | * | 6/1995 | Williams | 200/85 A |
| 5,527,053 A | * | 6/1996 | Howard | 280/90 |
| 5,678,854 A | * | 10/1997 | Meister et al. | 280/735 |
| 5,774,069 A | | 6/1998 | Tanaka et al. | 340/903 |
| 5,941,920 A | * | 8/1999 | Schubert | 701/37 |

* cited by examiner

*Primary Examiner*—Tan Nguyen
(74) *Attorney, Agent, or Firm*—Wagner Murabito & Hao LLP

(57) ABSTRACT

A method and apparatus that allows for safely operating a vehicle when an automatic steering control feature of a guidance control system is in operation. One or more sensors are used to determine whether the operator is in the vehicle. If the sensors detect that the operator has left the vehicle, the vehicle is shut off. The safety system includes one or more software programs that operate to determine whether the guidance control system is operating properly. More specifically, a control unit is coupled to the microprocessor and the steering control mechanism for determining whether or not an error condition has occurred. In the event that an error condition has occurred, the guidance control system is disengaged and control of the vehicle is turned over to the operator. In one embodiment, the safety system determines whether the operator is ready to take control of the vehicle prior to disengaging the guidance control system. If the operator is not ready to take control of the vehicle, the vehicle is shut off.

13 Claims, 5 Drawing Sheets

| ERROR CONDITION |
| --- |
| ELECTRO-HYDRAULIC VALVE-COIL SHORT |
| ELECTRO-HYDRAULIC VALVE-COIL OPEN |
| FET - SHORT |
| FET - OPEN |
| FET-SWITCHED ON PERMANENTLY |
| ELECTRO-HYDRAULIC VALVE-COIL GROUNDED |
| ELECTRO-HYDRAULIC VALVE-CABLE GROUNDED |
| ELECTRO-HYDRAULIC VALVE-CABLE OPEN |
| RAM SENSOR STUCK |
| RAM SENSOR MISALIGNED |
| SAFETY SYYSTEM MICROPROCESSOR-WATCHDOG PROGRAM TIMEOUT |
| GUIDANCE CONTROL SYSTEM MICROPROCESSOR-WATCHDOG PROGRAM TIMEOUT |
| SOFTWARE OR FIRMWARE ERROR-VIOLATION OF STEERING ANGLE LIMIT |
| POSITION DETERMINATION SYSTEM ERROR |
| NON-MOVING TRACTOR WHEN POSITION DETERMINATION SYSTEM SHOWS MOVEMENT |

FIGURE 5

SAFETY SYSTEM FOR GUIDANCE CONTROL SYSTEM

TECHNICAL FIELD

This invention relates to vehicle automated guidance control systems. Specifically, the present invention relates to an apparatus and a method that assures the safe operation of a vehicle when the vehicle is under the control of a guidance control system.

BACKGROUND ART

Tractors and other vehicles used in farming operations must be operated precisely to obtain uniform rows during planting and to harvest crops efficiently. Typically tractors used for planting rows of crops are operated manually by an operator who drives the tractor along each row to be planted. The operator must be very careful in order to get uniform rows of planted crops. It is difficult for an operator of a tractor to maintain precise positioning of the tractor relative to rows that have already been planted since the operator has no reference other than the position of the row that was most recently planted to use as a guide. In addition, it is difficult to maintain the concentration necessary to obtain straight rows, particularly since concentration often decreases with each passing hour of planting.

One prior art method for controlling the travel path of a vehicle such as a tractor includes the use of a guidance control system that includes an automatic steering control feature. These guidance control systems typically include a position determining system for determining position and a vehicle controller for controlling the steering of the vehicle. One method for position determination involves the use of satellites of the US Global Positioning System (GPS) to determine position. However, other types of position determination systems may also be used. The guidance control system typically includes a vehicle controller operable in response to an operator input mechanism and a display.

Once the operator is properly positioned and is ready to start planting a row, he operates an input device so as to activate the automatic steering control feature of the guidance control system. The automatic steering control feature of the guidance control system operates the steering of the tractor so as to maintain proper alignment of the vehicle as a row is planted.

Once the automatic steering control feature is engaged, the tractor moves up and down each row and performs the steering automatically. In many tractors equipped with automatic steering control, cruise control is also provided. Thus, the operator is only required to monitor the automated steering control and the cruise control. Typically, tractors under automated steering control operate at a speed of 3 to 6 miles per hour and as high as 20 miles per hour.

Though these prior art systems effectively and efficiently perform the desired operations, operators often become bored and inattentive. Sometimes operators will attempt to leave the tractor as it is operating. This may be for the purpose of removing obstructions that lie in the path of the tractor, taking a lunch break, talking with a friend, etc. The operator may be injured as he attempts to climb down from the moving tractor. In addition, the operator may be run over by the tractor or equipment attached to the tractor as he attempts to get off the tractor.

Injury can also occur as the operator tries to climb back onto the moving tractor. More specifically, the operator can fall as he attempts to board the moving tractor, resulting in the operator being struck by the tractor. This can result in serious injury and even death.

Injuries may also occur while the tractor is stationary. When a tractor is stopped and the automatic steering control feature is engaged, voltage spikes, hardware, firmware, and software malfunctions may occur. These malfunctions may result in injuries. When an operator is attempting to fix a problem or a malfunction on the tractor, malfunctions may result in the movement of the tractor which can cause the movement of the steering system. The movement of the steering system and/or the tractor itself can cause the operator to be crushed or injured by the movement. One particularly dangerous type of movement of the steering system is commonly referred to as "railing." Railing is the sudden movement of the steering system fully to one side or the other.

Malfunctions in hardware, firmware, and software may also cause injury and possibly property damage during proper operation of the tractor. For example, when the automated steering control is in operation and a malfunction occurs, unintended movement of the steering system may result. This can cause damage to crops, injury, collision of the tractor, and in some instances may cause the tractor to flip over. Malfunctions that result in railing of the steering system are particularly likely to cause injury since the tractor is likely to flip over or collide with objects or vehicles.

What is needed is a way to assure the safety of a vehicle that has a guidance control system. More particularly, a way to prevent malfunctions from injuring an operator both when the tractor is moving and when the tractor is stationary is needed. In addition, a safety system is needed to prevent an operator from leaving a tractor while the automated steering control is engaged. The present invention meets the above needs.

DISCLOSURE OF THE INVENTION

The present invention provides a method and apparatus which provides for safely operating a vehicle when the automatic steering control feature of a guidance control system is engaged.

A safety system is disclosed that is electrically coupled to the vehicle's guidance control system. The safety system includes one or more sensors that are monitored so as to determine whether the operator is in the vehicle. In one embodiment, the sensors include a dead-man switch that must be periodically operated by an operator.

When the safety system detects that the operator is attempting to leave the vehicle when the automatic steering control feature of the guidance control system is engaged, the safety system either shuts off the vehicle or disengages the automated steering control feature. This prevents the operator from leaving a moving tractor since the tractor will not continue to operate without the operator's presence. Thus, potential injury and property damage are avoided.

The safety system of the present invention also prevents movement of the vehicle's steering system when the vehicle is stopped. This allows for safe vehicle repair and maintenance and prevents accidents resulting from tampering with the vehicle's guidance control system components.

Though the present invention is described with reference to use in a vehicle which is a tractor, the present invention may be used in other types of vehicles such as, for example, harvesters, wind rowers, spray rigs, fertilizer delivery vehicles, pesticide delivery vehicles, track vehicles, belt driven tractors, and harvest collection vehicles such as general purpose trucks, flat bed trucks, and tractor-trailer rigs.

These and other objects and advantages of the present invention will no doubt become obvious to those of ordinary skill in the art after having read the following detailed description of the preferred embodiments that are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 5 is a diagram showing error conditions in accordance with the present claimed invention.

BEST MODE FOR CARRYING OUT THE INVENTION

Figure 1:
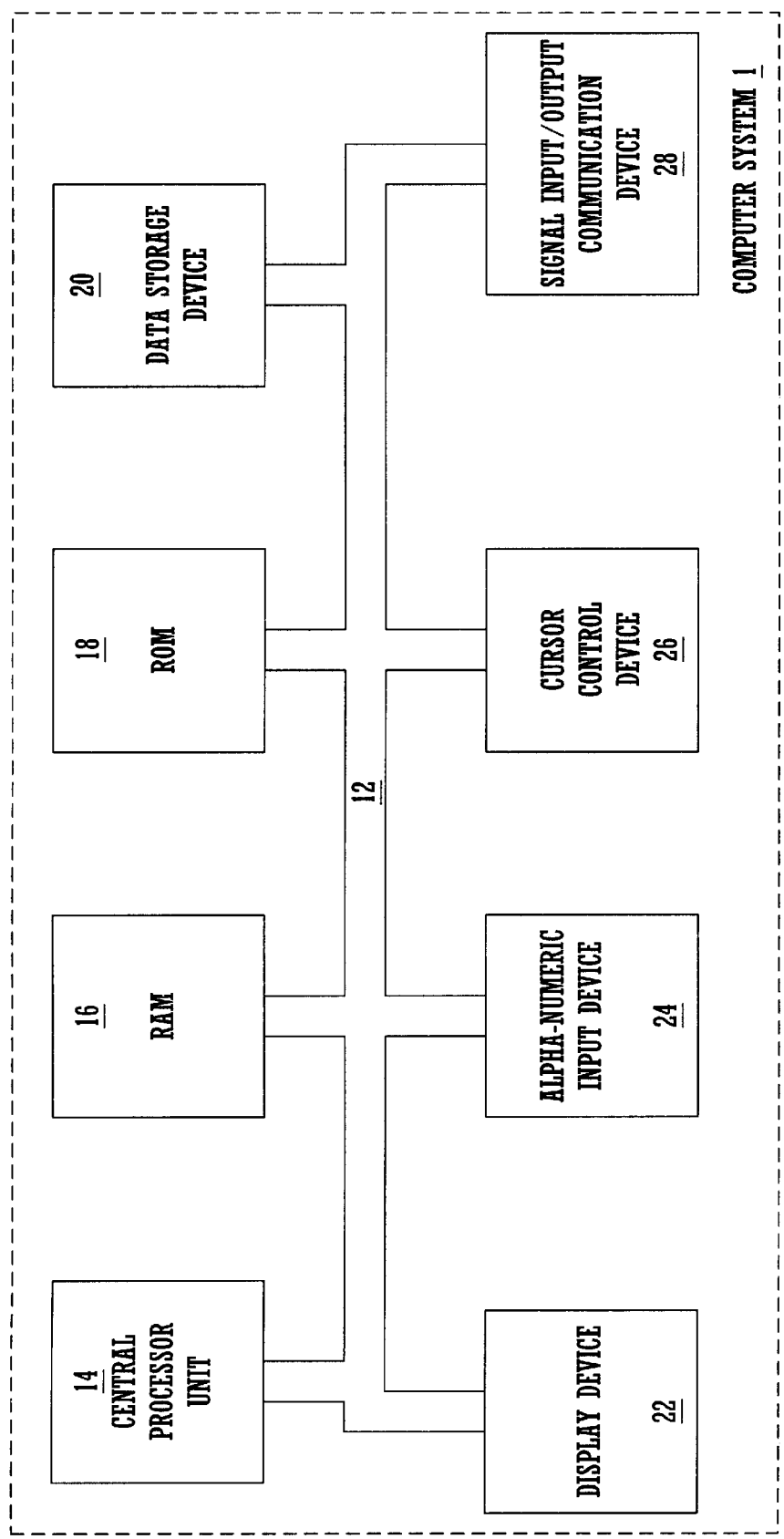
FIG. 1 is a schematic diagram of an exemplary computer system used as a part of a safety system in accordance with the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "designating", "incorporating", "calculating", "determining", "communicating" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

With reference now to FIG. 1, portions of the safety system of the present invention are comprised of computer executable instructions that reside in a computer system. FIG. 1 illustrates an exemplary computer system 1 used as a part of a safety system in accordance with the present invention. It is appreciated that the computer system 1 of FIG. 1 is exemplary only and that the present invention can operate within a number of different computer systems including general-purpose computers systems, embedded computer systems, and stand alone computer systems.

Computer system 1 of FIG. 1 includes an address/data bus 12 for communicating information, a central processor unit 14 coupled to bus 12 for processing information and instructions. Computer system 1 also includes data storage features such as a random access memory (RAM) 16 coupled to bus 12 for storing information and instructions for central processor unit 14, a read only memory (ROM) 18 coupled to bus 12 for storing static information and instructions for the central processor unit 14, and a data storage device 20 (e.g., a magnetic or optical disk and disk drive) coupled to bus 12 for storing information and instructions. Computer system 1 of the present embodiment also includes a display device 22 coupled to bus 12 for displaying information to a computer operator. An alphanumeric input device 24 including alphanumeric and function keys is coupled to bus 12 for communicating information and command selections to central processor unit 14.

Display device 22 of FIG. 1, utilized with computer system 1 of the present invention, may be a liquid crystal device, cathode ray tube, or other display device suitable for creating graphic images and alphanumeric characters recognizable to the user. Cursor control device 26 allows the computer user to dynamically signal the two-dimensional movement of a visible symbol (cursor) on a display screen of display device 22. Many implementations of cursor control device 26 are known in the art including a trackball, mouse, touch pad, joystick or special keys on alphanumeric input device 24 capable of signaling movement of a given direction or manner of displacement. Alternatively, it will be appreciated that a cursor can be directed and/or activated via input from alphanumeric input device 24 using special keys and key sequence commands. The present invention is also well suited to directing a cursor by other means such as, for example, voice commands. Computer system 1 also includes a cursor control device 26 coupled to bus 12 for communicating user input information and command selections to central processor unit 14, and a signal input output communication device 28 (e.g. a modem) coupled to bus 12.

Figure 2:
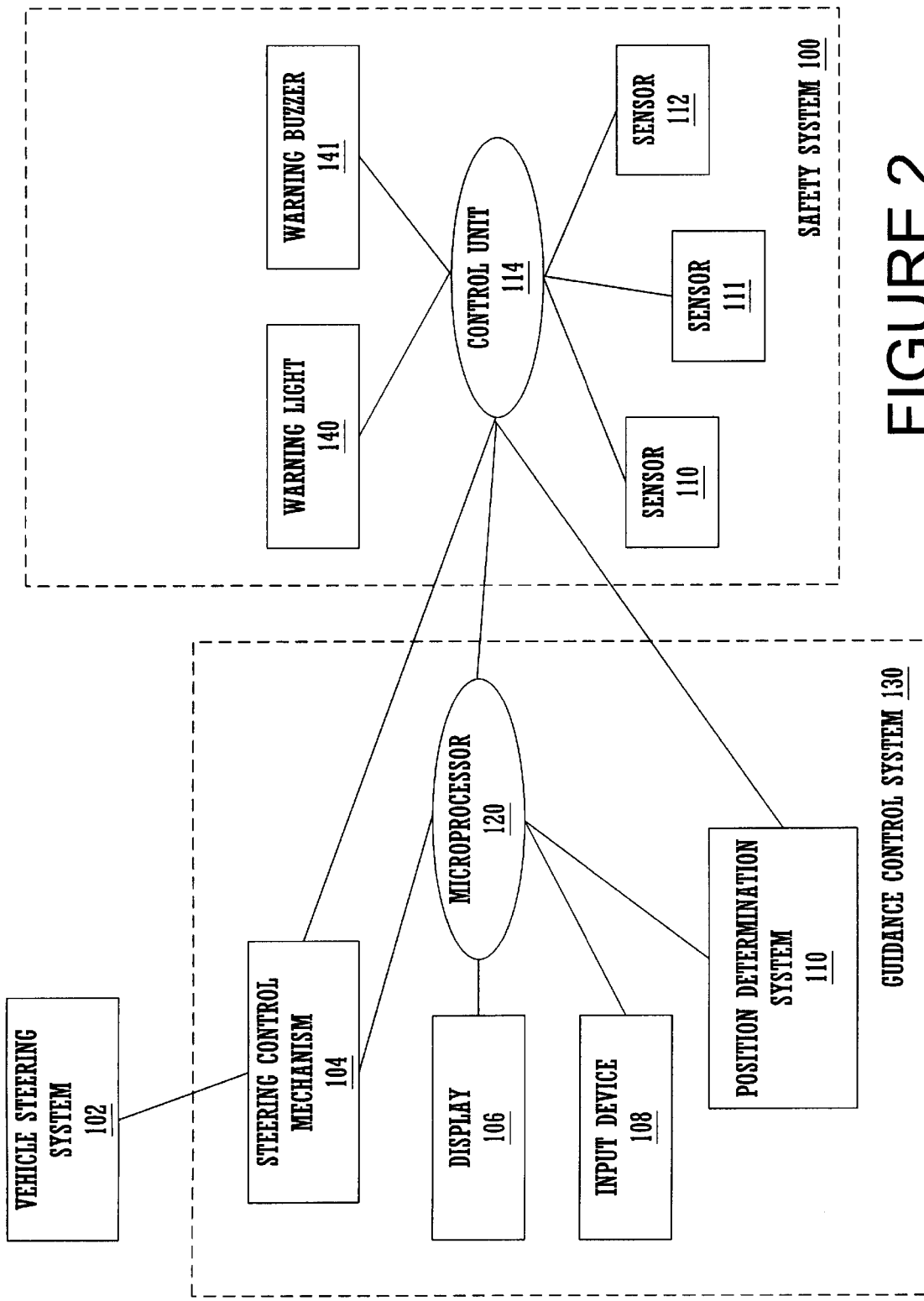
FIG. 2 is a logical representation of a safety system, a guidance control system, and a vehicle steering system in accordance with the present claimed invention.

FIG. 2 shows a safety system for assuring safety when guidance control system 130 is controlling vehicle steering system 102. Typically, a vehicle's steering system, shown generally as vehicle steering system 102, includes a steering wheel and a hydraulic system for translating the movement of the steering wheel to the wheels of the vehicle. Guidance control system 130 is shown to include steering control mechanism 104 that controls vehicle steering system 102. Steering control mechanism 104 may use any of a number of known methods for controlling vehicle steering system 102. Guidance control system 130 also includes microprocessor 120 which, in response to input through input device 108 and position determination system 110 determines steering instructions that are communicated to steering control mechanism 104. Typically, microprocessor 120 includes electronic circuitry that couples instructions to steering control mechanism 104. Display 106 allows a user to monitor the operation of guidance control system 130.

Safety system 100 is shown to include sensors 110–112, warning light 140, and warning buzzer 141. Control unit 114 controls the operation of safety system 100 and is coupled to sensors 110–112 to warning light 140, and to warning buzzer 141. In one embodiment of the present invention, sensors 110–112 are placed within the cab of the vehicle so as to monitor the presence of an operator. That is, sensors 110–112 detect whether or not the operator is in the cab of the vehicle. In one embodiment, sensor 110 is a dead-man switch that must be periodically pressed by the operator. In the event that sensor 110 is not pressed by the operator at the required time, warning buzzer 141 and warning light 140 are engaged. If a predetermined amount of time has elapsed and the operator still has not operated sensor 110, a shut down of the vehicle is initiated by control unit 114.

Continuing with FIG. 2, in one embodiment, control unit 114 is a general-purpose computer such as computer 1 of FIG. 1. Alternatively, control unit 114 is an integrated circuit device such as a microcontroller or an Application Specific Integrated Circuit device (ASIC) or a Field Programmable Gate Array (FPGA) device.

In an embodiment where one or more sensors are coupled to correction control unit 114 that are analog, correction control unit 114 will include an analog to digital converter (not shown) for converting the analog signals received from the sensor or sensors into digital form.

Figure 3:
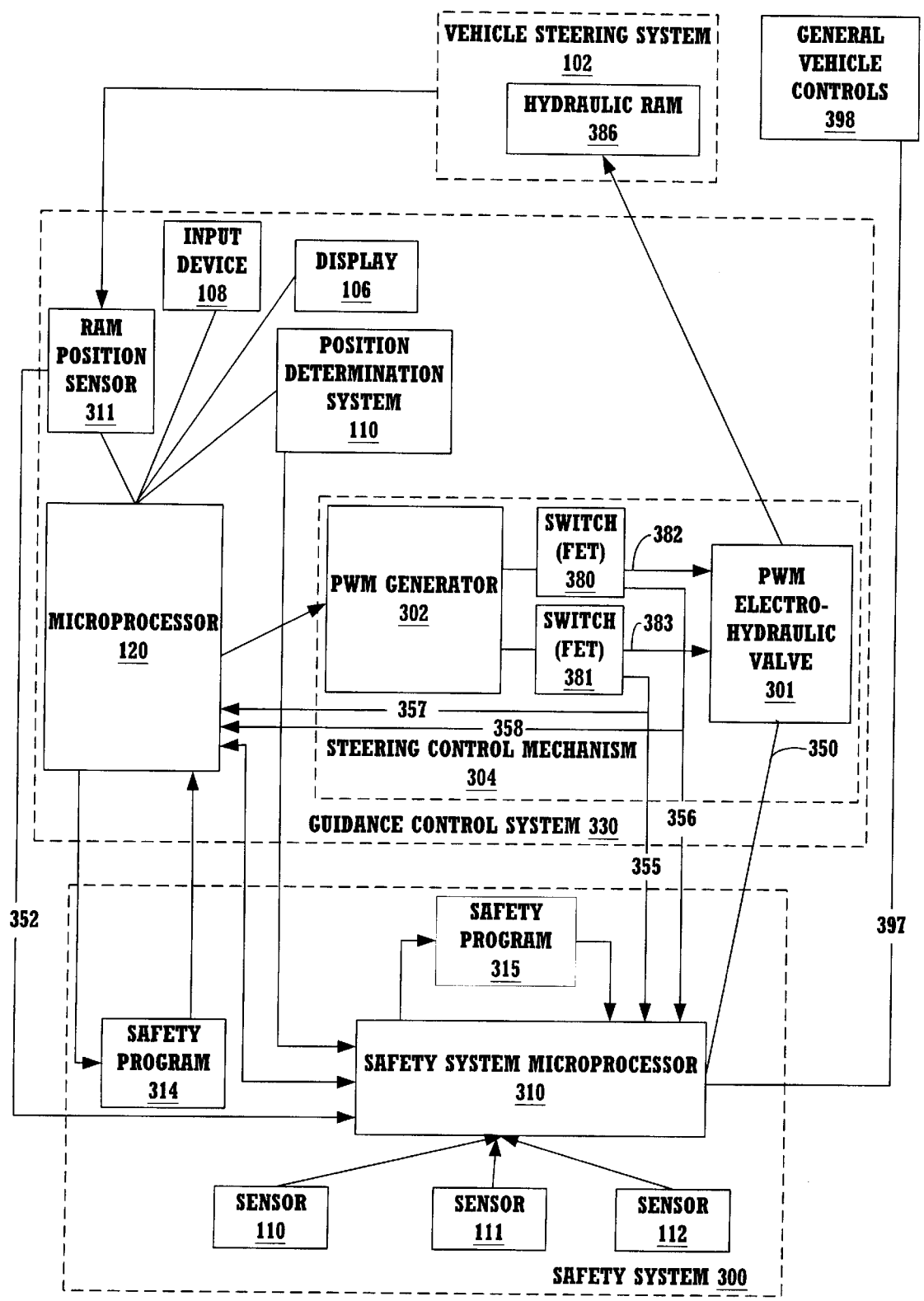
FIG. 3 is a logical representation of a vehicle steering system that includes a hydraulic ram, a guidance control system that controls the movement of the hydraulic ram, general vehicle controls, and a safety system in accordance with the present claimed invention.

FIG. 3 shows a specific example of a guidance control system 330 that includes a ram position sensor 311 and a steering control mechanism 304 which uses an electro-hydraulic valve 301 to control a hydraulic ram 386 of a vehicle steering system 102. The steering control mechanism 304 includes a Pulse Wave Modulated (PWM) electro-hydraulic valve 301 that is operable in response to input from Pulse Wave Modulated (PWM) generator 302 for controlling the steering of the vehicle. In one embodiment, PWM generator 302 is coupled to PWM electro-hydraulic valve 301 by dual electrical cables that are represented by lines 382–383. Line 382 is shown to couple to switch 380 and line 382 is shown to couple to switch 381. In one embodiment, switches 381–382 are Field Effect Transistor (FET) switches that alternately couple electrical pulses to opposite sides of the coil of PWM electro-hydraulic valve 301 for controlling the operation of PWM electrohydraulic valve 301.

Continuing with FIG. 3, safety system 300 is shown to include sensors 110–112 that monitor whether or not the operator is in the vehicle, and safety system microprocessor 310. Safety system 300 also includes safety program 314 and safety program 315. Safety program 314 is adapted to run on microprocessor 120 of the vehicles guidance control system 330 and safety program 315 is adapted to run on safety system microprocessor 310.

Ram position sensor 311 senses the position of the hydraulic ram 386 and couples the position to microprocessor 120. In one embodiment, safety system microprocessor 310 is also coupled to ram position sensor 311 as shown by arrow 352. Input from ram position sensor 311 is used to verify the position of vehicle steering system 102 so as to assure that the vehicle is moving as instructed by microprocessor 120. Other input is also coupled to microprocessor 120 such as odometer data, gear number, radar, rate gyros, and other instrument data. This input, along with data from position determination system 110 allows microprocessor 120 to effectively control the guidance of the vehicle. Continuing with FIG. 3, microprocessor 120 is responsible for all aspects of control under non-fault conditions. This includes the control of waypoint management, path error estimation, vehicle steering, feedback using ram position sensor 311, and steering strategy for path following.

Referring still to FIG. 3, safety program 315 and safety program 314 operate to detect error conditions that may result in property damage and/or injury during the operation of guidance control system 330. Safety program 314 operates on microprocessor 120. In one embodiment, safety program 314 includes a "watchdog" timer program that monitors program execution. In one embodiment, safety program 314 also contains a monitor program that monitors whether or not PWM generator 302 is generating the required waveform. This program receives input via lines 357 and 358 which couple to switches 380–381. In the event that a signal is not received from switches 380–381 within a predetermined time, an error condition has occurred. In one embodiment, a time period of 100 milliseconds is used. Upon the occurrence of an error condition, safety program 314 will flag the error condition to safety system microprocessor 310. In one embodiment, safety program 314 also monitors the data integrity and the operation of position determination system 110. In one embodiment, safety program 314 monitors other error conditions such as, for example, the error conditions listed in FIG. 5.

Continuing with FIG. 3, safety program 315 operates on safety system microprocessor 310 for determining if an error has occurred. In one embodiment, safety program 315 includes a watchdog timer program that monitors program execution for programs that operate on safety system microprocessor 310. In one embodiment, safety program 315 also contains a monitor program that monitors whether or not PWM generator 302 is generating the required waveform. This program receives input via lines 355 and 356 which couple to switches 380-381. In one embodiment, safety program 315 also monitors the data integrity and the operation of position determination system 110. Safety program 315 and safety system microprocessor 310 include provision for monitoring other error conditions such as, for example, the error conditions listed in FIG. 5. As shown by line 350, safety system microprocessor 310 is coupled to PWM electro-hydraulic valve 301. This allows for microprocessor 310 to shut off power to electro-hydraulic valve 301 when required by the occurrence of an error condition. In one embodiment, microprocessor 310 is coupled to the coil power control for PWM electro-hydraulic valve 301 such that coil power may be shut off. This may be accomplished by the use of a dedicated switch (not shown) or may be accomplished by other means (e.g. grounding, or transmission of a given signal), as dictated by the design of the PWM electro-hydraulic valve 301. Safety system microprocessor 310 also connects to the operational control systems 398 as shown by line 397. This allows safety system microprocessor 310 to operate to stop the vehicle when error conditions require that the vehicle be stopped. General vehicle controls include braking system controls, engine controls, and clutch and transmission controls.

Figure 4:
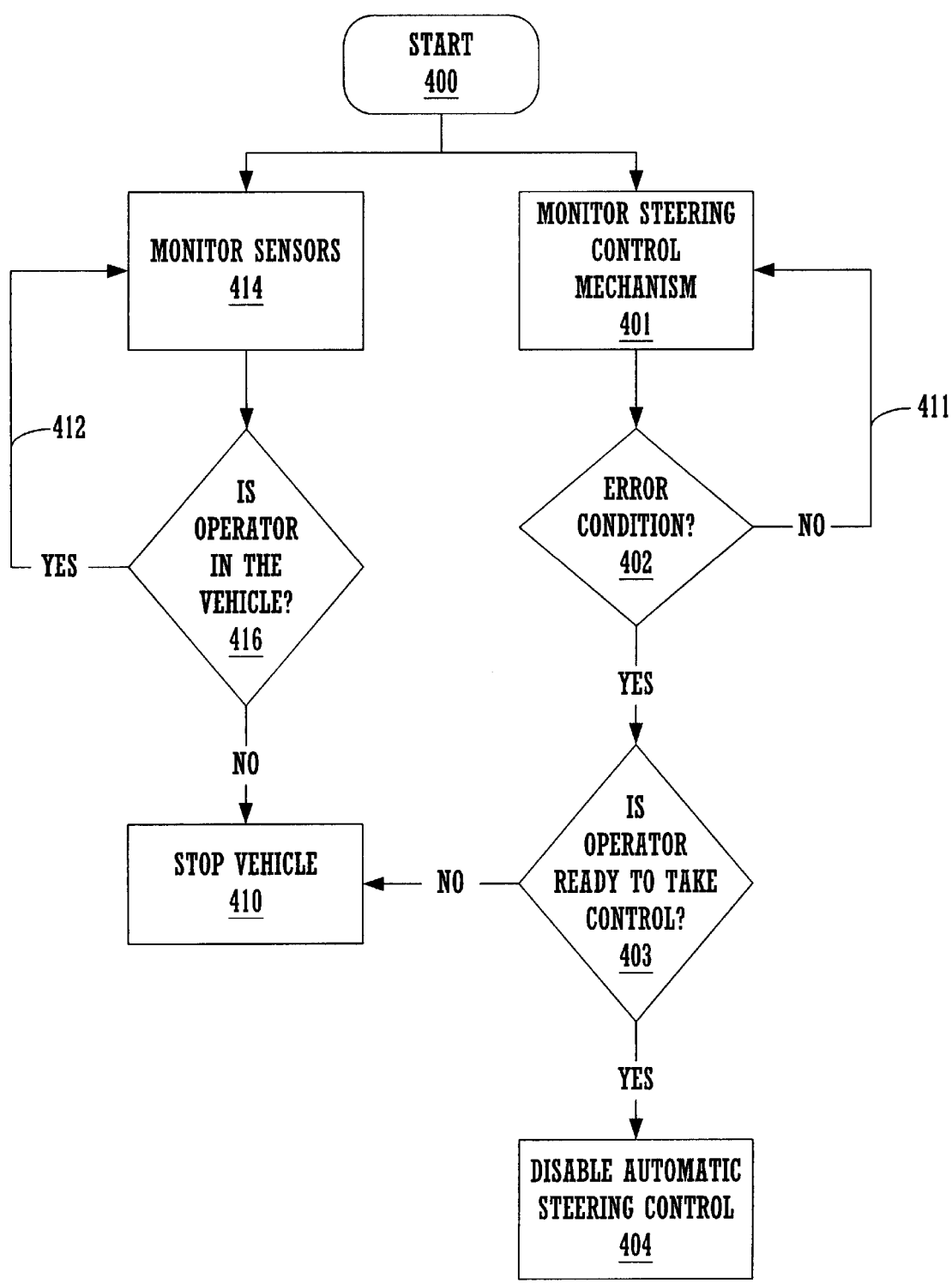
FIG. 4 is a diagram showing steps performed by the safety system in accordance with the present claimed invention.

FIG. 4 shows the steps for assuring safe operation of a guidance control system starting at step 400. As shown by block 401, the steering control mechanism is monitored for error conditions. As shown by arrow 411, monitoring of the steering control mechanism continues until an error condition is detected. When an error condition is detected, if the operator is ready to take control of the vehicle, the automated steering control is disabled as shown by decision blocks 402–404.

In one embodiment, an error condition is deemed to occur when the watchdog program in safety programs 314 or 315 of FIG. 3 are timed-out. An error condition is also deemed to occur when there is a failure to receive an update from the PWM generator within two cycles of the PWM period. In addition, lines 355–356 are monitored for the proper duty cycle (for direct detection of switch fault or PWM generator error) and an error condition is deemed to occur when the proper duty cycle is not observed. Since safety system microprocessor 310 and safety program 315 are separate from the components of guidance control system 330, programming errors and hardware errors in guidance control system 330 are readily determined. Thus, even if a malfunction in microprocessor 120 and/or a software glitch causes a malfunction that is not detectable by safety program 314, the malfunction will be detected by safety program 315. This redundancy adds additional safety to the operation of guidance control system 330.

Continuing with FIG. 4, in one embodiment, the operation of safety program 314 is monitored by safety program 315 and the operation of safety program 315 is monitored by safety program 314 to make sure that all safety programs are operating properly. In one embodiment, safety program 314 is monitored by a watchdog program in safety program 315. Similarly, in one embodiment, safety program 315 is monitored by a watchdog program in safety program 314.

Continuing with FIG. 4, in one embodiment, a determination as to whether the operator is ready to take over control of the vehicle is made as shown by decision block 403 prior to disconnecting the guidance control system. By assuring that the operator is ready to take control of the steering of the vehicle, potential injury and damage resulting from the turning of control over to a driver who is not ready to assume steering control is avoided.

Continuing with FIG. 4, in one embodiment, the operator is notified of the error condition and is required to take a particular action in order to assure that the operator is ready to assume control of the vehicle. In one embodiment, the operator is notified of the error condition by a message that is shown on a display such as display 106 of FIGS. 2–3. Alternatively, the operation of an indicator light and/or a buzzer indicates the error condition. In the embodiment shown in FIG. 2, warning light 140 and warning buzzer 141 are activated in order to notify the driver of the error. In one embodiment, the driver is then required to take some action to indicate that the operator is ready to take control of the vehicle.

Continuing with FIG. 4, in one embodiment, a prompt is shown on display 106 of FIGS. 2–3 that asks if the driver is ready to assume manual control of the vehicle and instructs the driver to take some action. If the operator does not take the proper action in response to the query (e.g. hitting a designated key on the input device), the vehicle is stopped as shown by block 410. This serves as an additional level of safety and prevents turning over steering control to an operator who is not aware of the situation (e.g. an operator who is asleep or is not paying attention). The process of stopping the vehicle may be performed in any of a number of ways. In one embodiment, the engine is shut off. Alternatively, the vehicle is throttled down to an idle. In one embodiment, the vehicle's braking system is activated so as to stop the vehicle. Alternatively, the transmission is disengaged or is moved into the lowest forward gear. In the embodiment shown in FIG. 3, the process of stopping the vehicle is accomplished through electrical signals sent from safety system microprocessor 310 to general vehicle controls 398.

Continuing with FIG. 4, in the event that the operator is ready to take control of the vehicle, the automatic steering control is disabled as shown by block 404. In the embodiment shown in FIG. 3, this disablement is accomplished by disconnecting the power to the coil of PWM electro-hydraulic valve 301.

Referring still to FIG. 4, sensors are monitored so as to assure that the driver remains in the tractor during operation of the guidance control system. In the embodiments shown in FIGS. 2–3, sensors 110–112 are monitored. In one embodiment, sensor 110 is a dead-man switch that must be periodically engaged in order to prevent an error condition. Sensor 110 may be operated in conjunction with warning light 140 and warning buzzer 141 to prompt the operator to operate sensor 110. That is, once a predetermined time period elapses, warning light 140 or warning buzzer 141 are engaged so as to notify the operator that the dead-man switch (sensor 110) must be operated. Unless the operator operates switch 110 within a predetermined amount of time, an error condition has occurred. In one embodiment sensor 111 detects whether the operator is sitting in the operator's seat. In one embodiment, sensor 111 detects the weight of the operator. An error condition occurs if there is insufficient weight on the operator's seat. In one embodiment, sensor 112 detects the opening of the door of the tractor. An error condition occurs if the door is opened while the automated steering feature is engaged. In an alternate embodiment, sensor 112 is a motion detector that detects motion within the doorway of the cab of the tractor. In the event that the operator moves out of the doorway, the sensor indicates an error condition.

Continuing with FIG. 4, as long as the operator remains in the tractor, the sensors continue to be monitored as shown by line 412. However, when the sensors indicate that the operator has left the vehicle as shown by step 416, the engine of the vehicle is shut off as shown by step 410. This prevents injury to the operator and property damage resulting from the operator leaving the tractor while the automated steering feature is engaged.

Referring now to FIG. 5, a chart showing examples of error conditions is illustrated. In one embodiment of the present invention, once an error condition is detected by the safety system of the present invention, further diagnostics are performed so as to determine which error condition is present in order to notify the operator of the exact error.

Continuing with FIG. 5, in one embodiment, the current through the switches 380–381 of FIG. 3 is checked to determine whether the current is within the proper limits for the given duty cycle at the current hydraulic ram slew rate.

If the current is not within the proper limits, an error condition is present. The error condition may be a short or an open condition in one of switches 380–381, or a PWM generator switched to one of switches 380–381 permanently. Once control of the vehicle has been returned to the operator, both switches 380–381 are pulsed and the current is checked to determine if the error is an open condition or a PWM generator permanently switched to one of switches 380–381. Then, both switches 380–381 are turned off and the current is checked to determine if the error is a short.

Continuing with FIG. 5, coil source current is checked against the sum of the output of both of switches 380–381 to determine if the coil in the electro-hydraulic valve or the cable to the electro-hydraulic valve is open or grounded. If the sum of the output is significantly different from the source current, an error condition is present.

Still referring to FIG. 5, checks for some error conditions are performed only under specific conditions. A check to determine if the ram position sensor is stuck is made when the PWM generator is near 0 or 100 percent (indicating a sharp turn in one direction or the other). This check compares the hydraulic ram velocity against the duty cycle to determine if an error is present. If the hydraulic ram velocity (indicated by the ram position sensor) is significantly less than the hydraulic ram velocity range predicted by the duty cycle, then the ram position sensor is stuck. When the vehicle is driving straight, the position indicated by the ram position sensor is compared against the yaw rate sensor (when the instrument package of the guidance control system includes a yaw rate sensor) to determine if there is a ram position sensor mechanical misalignment (often, considerable averaging is required to prevent slippage of the vehicle in wet soil conditions from incorrectly generating an error condition). When the tractor is parked, the safety system microprocessor is checked for error conditions.

Referring still to FIG. 5, as previously discussed, an error condition is present if the watchdog program running on the safety system microprocessor times out or if the watchdog program running on the microprocessor of the guidance control system times out. In addition, the velocity of the vehicle's tires is compared against a look-up table of maximum tire velocity versus turn angle to determine whether there is an error in the software and/or firmware of the guidance control system. In the event that the velocity of the vehicle's tires exceeds the maximum tire velocity for the vehicle's present turn angle, an error condition is present that could cause the tractor to roll over.

Referring still to FIG. 5, in one embodiment, the position determination system is monitored for errors. In this embodiment, significant errors in position determination also generate an error condition. A determination as to whether a significant error has occurred in the position determination system may be made using any of a number of methods. One method includes monitoring position determination data for assessing position determination data integrity and/or accuracy. Also, the vehicle's velocity may be compared to the velocity calculated using position determination system data. The vehicle's measured velocity is obtained from wheel sensors, radar, or other systems on the vehicle that allow for the determination of velocity. In addition, when the position determination system indicates that the vehicle is moving and the vehicle is stopped, an error condition is generated. In one embodiment, sensors that monitor the movement of the wheels are used to determine whether or not the vehicle is moving. This prevents the guidance control system from moving the steering system when the vehicle is stopped. The potential for injury is particularly high in this instance since a person seeing the non-moving vehicle could readily assume that it is safe to perform maintenance on the vehicle due to the fact that the vehicle is stopped.

Though the safety system of the present invention is described with reference to the use of computer programs that operate on a microprocessor, or on a computer system, the programs could be imbedded into the microprocessor. In one embodiment, an ASIC device that is programmed to perform the desired functions is used. Alternatively, a FPGA device that is programmed to perform the desired functions is used.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. For a tractor that includes a vehicle steering system that is a hydraulic steering system and a guidance control system that has a steering control mechanism that is engaged to automatically control the vehicle steering system, a method of assuring safe operation comprising:

monitoring said steering control mechanism so as to assure that said guidance control system is operating properly;

monitoring a sensor located within said tractor, said sensor for detecting the presence of the operator of said tractor;

disengaging the steering control mechanism when the output of said steering control mechanism indicates that an error condition has occurred and when the operator is determined to be ready to take control of said tractor;

stopping said tractor when said sensor indicates that the operator is not in said tractor; and stopping said tractor when an error condition has occurred and the operator is not determined to be ready to take control of the tractor.

2. The method of claim 1 wherein said guidance control system includes a microprocessor, and wherein said step of monitoring the output of said steering control mechanism further comprising the step of:

monitoring the operation of said steering control mechanism using a computer program operable by said microprocessor.

3. The method of claim 2 wherein said steering control mechanism includes a pulse wave modulated generator and a pulse wave modulated electro-hydraulic valve, said computer program determining that an error condition has occurred when an update from said pulse wave modulated generator has not been transmitted in a predetermined time period.

4. The method of claim 1 wherein said sensor is a dead-man switch and wherein said step of monitoring a sensor further comprises the step of:

determining if an operator has operated said dead-man switch within a predetermined amount of time.

5. The method of claim 1 wherein the tractor includes a seat and wherein said sensor indicates whether or not the operator is sitting in said seat, said step of monitoring said sensor further comprising the step of:

determining if an operator is sitting in said seat.

6. The method of claim 1 wherein the tractor includes a door and wherein said sensor indicates whether or not the door has been opened, said step of monitoring said sensor further comprising the step of:

determining if an operator has opened said door while said guidance control system is engaged.

7. The method of claim 1 further comprising the step of:

providing a safety system microprocessor, said safety system microprocessor coupled to said microprocessor and to said steering control mechanism.

8. The method of claim 1 further comprising the step of:

monitoring the operation of said steering control mechanism using said safety system microprocessor.

9. In a computer system including a processor coupled to a bus, and a memory unit coupled to said bus for storing information, a computer-implemented method for assuring safe operation of a tractor having a vehicle steering system that is a hydraulic steering system and having a guidance control system that includes a steering control mechanism, said computer-implemented method comprising the steps of:

monitoring said steering control mechanism so as to assure that said guidance control system is operating properly;

monitoring a sensor located within said tractor, said sensor for detecting the presence of the operator of said tractor;

disengaging said steering control mechanism when an error condition has occurred and when the operator is determined to be ready to take control of said tractor;

stopping said tractor when said sensor indicates that the operator is not in said tractor; and stopping said tractor when an error condition has occurred and the operator is not determined to be ready to take control of the tractor.

10. The computer implemented method of claim 9 wherein said steering control mechanism includes a pulse wave modulated generator and a pulse wave modulated electro-hydraulic valve, said method further comprising the step of:

determining that an error condition has occurred when an update from said pulse wave modulated generator has not been transmitted within a predetermined time period.

11. The method of claim 10 wherein said sensor is a dead-man switch and wherein said step of monitoring a sensor further comprises the step of:

determining if an operator has operated said dead-man switch within a predetermined amount of time.

12. The method of claim 10 wherein the tractor includes a seat and wherein said sensor indicates whether or not the operator is sitting in said seat, said step of monitoring said sensor further comprising the step of:

determining if an operator is sitting in said seat.

13. The method of claim 10 wherein the tractor includes a door and wherein said sensor indicates whether or not the door has been opened, said step of monitoring said sensor further comprising the step of:

determining if an operator has opened said door while said guidance control system is engaged.

* * * * *